United States Patent [19]

Utena et al.

[11] 4,247,574

[45] Jan. 27, 1981

[54] METHOD OF PRODUCING TEXTURED PROTEIN AND TEXTURED PROTEIN PRODUCED THEREBY

[75] Inventors: Makoto Utena, Niiza; Kazuhisa Yamada, Tokyo; Hidemoto Kamada, Tokyo; Kaoru Inagami, Tokyo, all of Japan

[73] Assignee: The Calpis Food Industry Co., Ltd., Tokyo, Japan

[21] Appl. No.: 51,060

[22] Filed: Jun. 22, 1979

[51] Int. Cl.$^3$ .............................................. A23J 3/00
[52] U.S. Cl. ................................... 426/656; 426/802
[58] Field of Search ............... 426/276, 656, 657, 802

[56] References Cited

U.S. PATENT DOCUMENTS

| | | | |
|---|---|---|---|
| 3,627,536 | 12/1971 | Arima et al. | 426/802 X |
| 3,674,500 | 7/1972 | Nagasawa et al. | 426/802 X |
| 3,794,731 | 2/1974 | Dannert et al. | 426/276 |
| 3,889,010 | 6/1975 | Brouwer | 426/276 |
| 3,987,213 | 10/1976 | Hawkins | 426/276 X |
| 4,018,903 | 4/1977 | Segeren et al. | 426/656 X |

*Primary Examiner*—Robert A. Yoncoskie
*Attorney, Agent, or Firm*—Browdy and Neimark

[57] ABSTRACT

A method of texturizing protein comprises accumulating the protein at the interface formed by a lower layer of aqueous liquid and an upper layer of gas, non-aqueous liquid, or solid under acid and heated conditions at a temperature above 110° C.

22 Claims, 5 Drawing Figures

METHOD OF PRODUCING TEXTURED PROTEIN AND TEXTURED PROTEIN PRODUCED THEREBY

FIELD OF INVENTION

The present invention relates to production of a textured protein, having accumulated structure, from a vegetable protein.

BACKGROUND OF INVENTION

Relating to texturizing vegetable protein, many methods have heretofore been known. For example, there is the spinning method in which an alkaline solution of protein is forcibly extruded through an orifice, and caused to be solidified in a bath containing a coagulant thereby making it to be fibrous. This method is superior in removal of the bad smell inherent in the raw material and in conversion to the desired fibrous structure, however it requires several chemicals for the process and complicated processing, and therefore it can not be said to be an economical method. As the method best known in the art, there is the so-called extruding method. This is a method wherein a protein raw material, heated at a high temperature and under pressure is discharged, thereby resulting in an expanded and texturized product. Many improvements of this method have been developed. This method has an advantage that its process is simple and allows the production of textured vegetable protein at a lower price. However, relating to the quality of products, there are still present the difficulties that most of bad smell inherent in the raw material remains and there is a lack of the desired fibrous textures.

Moreover, recently there has been developed a method of making a reticulated textured structure by use of steam. For example, Japanese Patent Application Laying-Open No. 15853/77 discloses such a method that in a treating area the protein is caused to be texturized by steam. This method is superior to the extruding method in quality and also to the spinning method in economy. However, the product has such a minute reticulated structure that it can be recognized only by microscopic examination, but it appears to be particle-like by observation with the naked eye, and therefore the use of the product is limited. Furthermore, there is known a method of Japanese Patent Application Publication No. 6665/74 in which the protein is texturized by making the protein in an aqueous liquid directly contact steam, but although this product also has such a reticulated structure as recognized only by microscopic examination, it is also one that has been broken into small pieces by the steam current. This steaming method is also insufficient in deodorization.

Moreover, the study by Saio et al. reported in J. Food Sci. 39 777 (1974) is one in which soybean protein is coagulated by calcium salt or acid to produce a curd, which is then dehydrated to make an aggregate, and this aggregate is introduced into water or a buffer solution and then put into an autoclave as it is and heated at a temperature above 100° C. This method requires a plurality of processes for causing the protein to be texturized, so that it can not be said to be an economical method, and also the resulting product has a porous structure like "Aburaage" (fried curd of soybean protein) or "Koridofu" (dried curd of soybean protein).

SUMMARY OF INVENTION

An object of the present invention is to obtain a textured protein which has a reticulated and accumulated structure and from which the bad smell, inherent in raw materials containing vegetable protein, has sufficiently been removed and which has an animal meat mouthfeel.

As an object of the invention is to obtain a food stuff having a structure like animal meat, therefore it is necessary that the obtained products (1) have a reticulated structure as the minute structure, (2) macroscopically have a certain degree of the accumulated structure and also a lateral spread, (3) have sufficiently been deodorized and also (4) its method of production be an economical one.

For attaining the above objects, an economical novel method is carried out wherein such textured protein is obtained without indigestible carbohydrate and bad-smelling fragment etc. present in a starting vegetable protein material in mixed state; such undesirable components are removed therefrom in the same process as the production of the textured structure of protein and at the same time the process provides a reticulated structure on the minute scale and an accumulated structure recognized by observation with the naked eye.

The present invention comprises the following steps: injecting an aqueous liquid containing a vegetable protein content of 1–30 W/W% through an orifice into a treating area where an interface is formed by a lower layer of an aqueous liquid and an upper layer of a gas, non-aqueous liquid or solid, and the protein is caused to be denatured at a pH 4.0–6.5 and at a temperature of 110°–200° C. while allowing the protein to accumulate at the interface, thereby texturizing the protein into accumulated structure, and at this time, the indigestible carbohydrate, bad-smelling fragment etc. which are contained in the raw vegetable protein material are dispersed into the aqueous liquid layer to be removed, and there is thus formed reticulated and accumulated textured protein having a high purity of protein. The protein injected floats up in the aqueous liquid of the treating area. Therefore, the protein strands are successively accumulated at the interface and they become thoroughly entangled, laterally spread and simultaneously combined to form a thick mat, and thereby the thus formed product becomes the textured protein having both spread and thickness. As described above, the present invention is such a method that can produce in a simple manner a product of good quality having superior structure without using special chemicals and additives and can attain the afore-mentioned four objectives.

There is seen in so-called "Yuba" (filmy curds of soybean protein) such a phenomenon that protein is subject to the denaturation at the interface, thereby producing a specific product. This phenomenon is such that when protein is denaturated at the interface formed by the heated soybean milk layer and gas layer under atmospheric pressure, a peculiar film is formed. This formation of Yuba film requires a heating for a long time and also the structure of the product is not a reticulated and accumulated structure, so that it is far from the animal meat-like structure.

It has been found that in the case where an interface of an aqueous liquid and air (gas) was formed under nonpressurized condition and an aqueous liquid containing protein was injected through an orifice at a pH near the isoelectric point, the protein was denatured by heating at the interface, but reticulated and accumulated textured protein was not obtained. Next, in the case that the temperature was raised, the heating was carried out at a temperature above 110° C. under pressurized condition and the aqueous liquid containing protein was injected through an orifice, it was found that a phenomenon quite different from the previous one results. Namely, it has become apparent that indigestible carbohydrate and bad-smelling fragments etc. dispersed out from the aqueous liquid containing protein and transferred into the aqueous liquid layer, and on the other hand, the protein was accumulated at the interface, so that the purity of protein became higher and as well the protein was sufficiently subjected to the denaturation by heating thereby forming a three-dimensional reticulated structure, and finally a textured protein of the type of a reticulated and accumulated form was obtained.

DETAILED DESCRIPTION OF EMBODIMENTS

Figure 1:
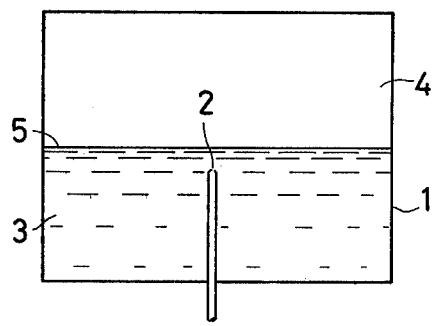
FIG. 1 is an explanatory view of an apparatus for producing a textured protein of the present invention used in Practical Example 1, wherein 1 is an autoclave, 2 is an injection orifice, 3 is a water layer, 4 is a steam layer, and 5 is an interface.
Figure 2:
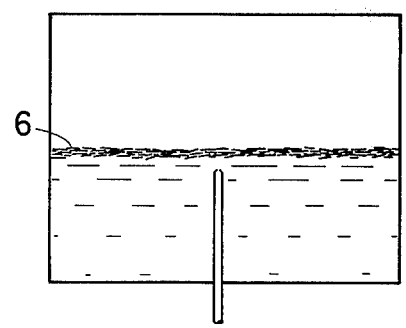
FIG. 2 shows accumulated textured protein in Practical Example 1, wherein 6 is a textured product.
Figure 3:
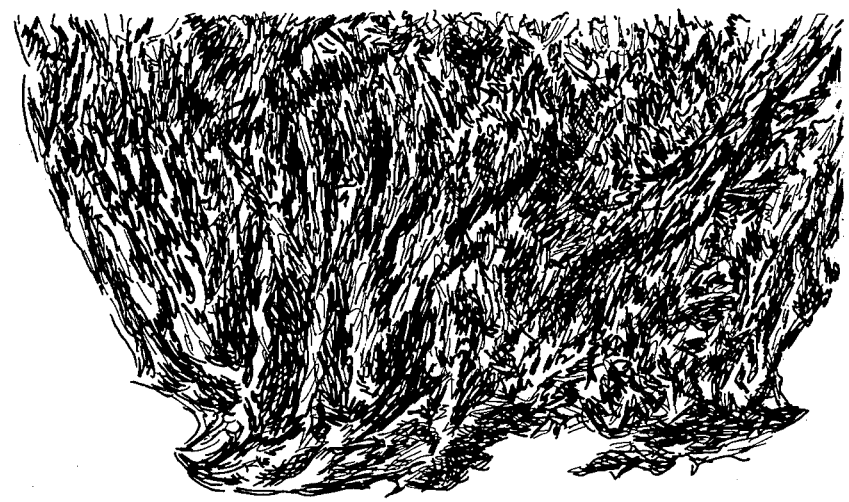
FIG. 3 is a view from above of the textured protein produced by Practical Example 1.
Figure 4:
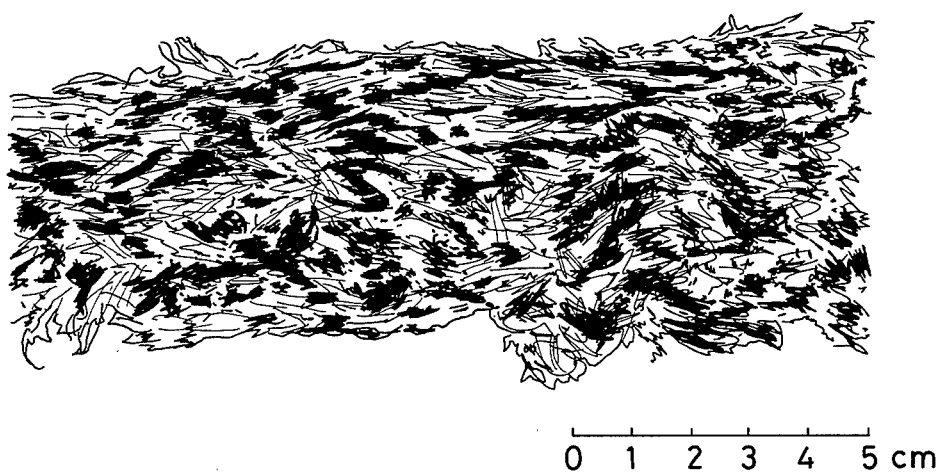
FIG. 4 is a view showing the fibrousness which is prepared by loosening the textured protein produced by Practical Example 1.
Figure 5:
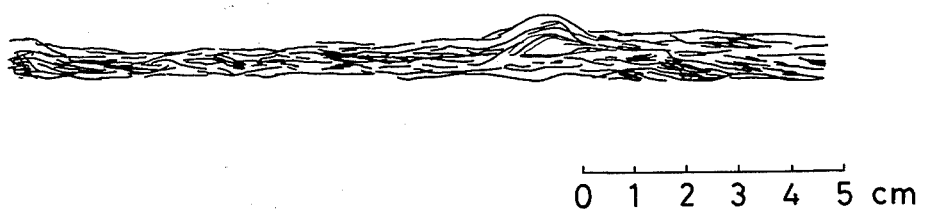
FIg. 5 is a sectional view showing the accumulated structure of the textured protein obtained by Practical Example 1.

Hereinafter, the present invention will be explained in detail.

The vegetable protein, referred to in the present invention, is one that is obtained from seeds of soybean, peanut, wheat and cotton etc. And more than two kinds of different vegetable proteins may be used as a mixture. Also, it is possible to add animal proteins such as milk casein, egg white etc. and protein of microorganism appropriately in such a degree that the present invention is not prevented from being carried out, and sometimes rather it may be preferable according to its object of use of the product.

In order to increase the yield by effectively accumulating the protein at the interface of the present invention or to change the structure of the product, it is effective to add a thickener such as guar gum, xanthan gum, gum arabic, agar, konjak mannan etc. or fat, but it is enough to add it in an amount of 3 W/W% and below relative to the vegetable protein. The material containing vegetable protein is dispersed in water and thus used as an aqueous liquid containing protein. The solid matter content in the aqueous liquid containing protein is 1–35 W/W%. In the case that the solid matter content is less than 1 W/W%, the yield of product becomes bad, and when it is above 35 W/W%, the fluidity of the aqueous liquid containing protein becomes poor and the injecting operation becomes difficult. The protein content in the aqueous liquid containing protein is 1–30 W/W%, and more preferably 3–20 W/W%. In the case that the protein content is less than 1 W/W%, the formation of the textured and accumulated structure becomes insufficient, but when it is above 30 W/W%, the fluidity of the aqueous liquid containing protein becomes poor and the operation becomes difficult.

The aqueous liquid containing protein is injected through an orifice into the treating area where there is formed an interface composed of the lower layer of an aqueous liquid and the upper layer of gas or non-aqueous liquid or solid. This treating area may be formed by a pressure-resisting container such as an autoclave. The product can be removed from the system by means of a rotary valve etc.

The interface referred to in the present invention may be anyone of the following three interfaces:
 (1) Interface formed by an aqueous liquid layer and a gas layer composed of steam, or steam and air;
 (2) Interface formed by an aqueous liquid layer and a non-aqueous liquid layer of fat etc.;
 (3) Interface formed by an aqueous liquid layer and a solid layer. For example, this corresponds to the case of the provision of metal plate, wire netting, belt or the like in the aqueous liquid.

In addition, it is possible to add to the aqueous liquid appropriately a boiling point changing substance such as glycerin, propylene glycol and salt, or pH adjusting agent, alkali earth metal salt etc. which are protein-denaturing substances.

Moreover, it is required for attaining the present invention that the interface be maintained in a quiet condition of such a degree that it is not prevented that the protein accumulated at the interface is mutually combined together into a larger structure. The well known method of making the textured structure by use of steam, for example the methods disclosed in said Japanese Patent Application Laying-Open No. 15853/77 or Japanese Patent Application Publication No. 6665/74, is also such one that the protein is texturized by denaturation by heating, however in these known methods, since the denaturation of protein proceeds under the fluid circumstances, namely under the dynamic condition, it is impossible to obtain a larger structure which can be obtained in the present invention, and instead only granular or small piece-like structures can be formed. Accordingly, these methods can not be said to be ones that utilize the interface referred to in the present invention.

The aqueous liquid containing protein is injected into this treating area through an orifice, and in the case of said treating area (1) which has the interface 5 formed by the aqueous liquid layer 3 and gas layer 4, the orifice 2 may be set in the aqueous liquid layer 3 near the interface as shown in FIG. 1 or it may be set in the gas layer near the interface for said injection. The position for the injection "near the interface" means that the orifice is spaced apart from the interface to such a degree that the accumulation of protein at the interface is never prevented. In the case that the orifice is set in the aqueous liquid layer for the injection, the protein accumulates at the interface while impurities in the aqueous liquid containing protein such as indigestible carbohydrate, bad-smelling fragments etc. are dispersed into the aqueous liquid layer, so that the protein of higher purity is left and accumulated at the interface and progressively subjected to the denaturation by heating sufficiently, resulting in producing the reticulated and accumulated textured protein. On the other hand, in the case that the orifice is set in the gas liquid thereby injecting the aqueous liquid containing protein from the gas layer, the removal of the impurities is poorer than the former. Namely the injecting position of aqueous liquid containing protein can be appropriately selected as required, however, the removal of the impurities such as the bad-smelling fragments etc. can be carried out more satisfactorily in the case where the position of the orifice is set in the aqueous liquid than in the case where it is set in the gas layer and a better textured protein can be obtained in the former case, and therefore the former case is preferable. In the case of the interface (2) that is formed by the aqueous liquid layer and non-aqueous liquid layer, the aqueous liquid containing protein can be injected in any one of the aqueous liquid layer, the nonaqueous liquid layer and the gas layer above these layers. However, in relation to the properties of the product and the removal of impurities such as indigestible carbohydrate, bad-smelling fragments etc., the most superior case is that the position of the orifice is set in the aqueous liquid layer for the injection. In the case of the interface (3) that is formed by the aqueous liquid and solid layer, the injection of the aqueous liquid containing protein is performed through the orifice located in the lower layer. In addition, the product formed at the interface (1) of the aqueous liquid layer and gas layer is superior in the mouthfeel as compared with those formed at the interfaces (2) and (3).

In the use of all three types of interfaces and all positions of injection location of orifice, it is required that the process be appropriately carried out in such manner that the injected protein becomes accumulated at the interface.

For the injection of the aqueous liquid containing protein into the treating area, it is required to use enough pressure to extrude said aqueous liquid into a pressurized treating area. In general, a pressure pump can be used. The size of the orifice through which the aqueous liquid containing protein is injected is varied according to the conditions, such as capacity of apparatus, performance of the pressure pump, viscosity of the aqueous liquid containing protein etc. The shape of the orifice may be any one of circle, ring, rectangle etc., and the number of the orifice is not always one, and it may be plural. The injecting velocity of the aqueous liquid containing protein into the treating area also is varied according to various conditions such as dimensions of the treating area etc., and it may be selected in accordance with the property of a textured protein which it is desired to obtain.

Moreover, in order to inject the aqueous liquid containing protein into the treating area and to cause the protein to be denatured by heating, thereby producing the reticulated and accumulated structure at the interface, it is necessary that when subjected to the denaturation by heating, the aqueous liquid be at a temperature of 110° C. and above under acid condition. In order to heat at a temperature of 110° C. and above, the heating is performed under pressure and the method of such a heating may be any one of direct heating method, method wherein heated steam is injected into the treating area, and indirect heating method by means of heat transfer agent. If the temperature falls to below 110° C., it becomes difficult to obtain the desired product. The upper limit of temperature is not restricted particularly, however considering the energy loss and the browning of product etc., a temperature of 200° C. and below is preferable. The heating period is varied according to the heating temperature and the structural properties of the product desired etc. For example, the higher the temperature is and the longer the product is left as it is at a high temperature, the harder and stronger the structure becomes.

Also, the acid condition is a pH of 4.0–6.5, preferably 4.5–5.5. In the case of a pH below 4.0 or above 6.5, even if the temperature is 110° C. and above, the desired textured structure is never produced. The pH adjusting is carried out by adjusting the pH of the aqueous liquid containing protein to be injected before the injection or by adjusting the pH of the aqueous liquid layer in the treating area, or by the combination of both. However from the viewpoint of easy operation, the superior method is that wherein the pH of the aqueous liquid containing protein to be injected is previously adjusted. For the pH adjustment, acid or alkali can be used, and for example hydrochloric acid, phosphoric acid, citric acid, sodium hydroxide, sodium bicarbonate etc. may be used.

Also, in order to obtain the textured protein with good yield, the following methods may be effective. Namely, in the aqueous liquid containing protein, it is preferred to treat in such manner that the protein and the mixed components such as carbohydrate are maintained in as much separated condition as possible, that the protein which is in association is maintained in the condition near the sub-unit, or that the protein is made hydrophobic, and so on. As this treatment method, it is possible to easily attain the object by the processes such that the aqueous liquid containing protein is previously heated, that it is retained under a stronger alkaline condition and thereafter adjusted to a pH near the isoelectric point by the use of acid, or that it is maintained under a stronger acid condition and thereafter adjusted to a pH near the isoelectric point by the use of alkali, and so on. In addition, as described above, if a thickener such as said gum and the like is added in the aqueous liquid containing protein there is an effect to prevent the protein from dispersing into the aqueous liquid layer. Relating to the aqueous liquid layer, it is also effective to adjust its pH close to the isoelectric point, to add salts which prevent the dissolution of protein, and so on.

In the aqueous liquid containing protein, a component which is easy to dissolve in the aqueous liquid at a temperature of 110° C. and above or a component which is highly hydrophilic becomes dispersed into the aqueous liquid layer while proceeding to the purification of protein. Accordingly, undesirable indigestible carbohydrate, bad-smelling fragments etc. are efficiently removed. For example, this is proved by the fact that in the case of use of a material containing approximately 57 W/W% (dry matter weight) of protein, the protein content of the final product increases to near about 90 W/W%. One of the characteristics of the present invention is that the purification of protein is carried out by such a simple operation.

Also, since the present invention is a method wherein the textured protein is obtained while the protein is accumulated at the interface, it may be carried out with variously changed shape and spread of the interface. For example, various ones such as elongate one, circular one, large thick sheet-like one and so on can be produced. This is also one of the characteristics of the present invention.

When the aqueous liquid containing protein is introduced into the aqueous liquid layer, the indigestible carbohydrate, bad-smelling fragments etc. are dispersed into the aqueous liquid layer, and on the other hand, the protein is gradually accumulated at the interface while it being subjected to the denaturation by heating, and with the progress of the denaturation by heating, the proteins become thoroughly entangled with each other and combine, and finally it is possible to obtain the reticulated and accumulated textured protein.

Accordingly, the present invention is an economical method wherein the purification of protein occurs at the same time as the removal of indigestible carbohydrate, bad-smelling fragment etc., and it is possible to produce the textured protein having a reticulated microstructure and an accumulated textured macrostructure.

In addition, according to the object of the application, the textured protein obtained by the present invention can appropriately be further treated by aqueous solution of sodium carbonate, aqueous ammonia solution, ammonia gas etc. in order to make the structure soft or to increase the affinity to water.

The textured protein obtained according to the present invention may be used as a substitute for animal meat in animal meat products such as corned beef, food boiled down in soya sauce, hamburger, shao-mai (ravioli like) etc. In the case of the prior art vegetable textured protein, it is impossible to sufficiently remove the vegetable smell, and also in the aspect of the structure, it is poor in fibrous property compared with animal meat, and accordingly, in the production of a food containing animal meat, it was difficult to substitute the textured protein for animal meat in an amount above about 30 W/W% of animal meat because there was a foreign and discordant feeling in taste and mouthfeel. However, the textured protein of the present invention has little vegetable smell, and in the aspect of the structure it is near that of animal meat, and therefore even if it is substituted for animal meat in an amount of about 50 W/W%, it is possible to obtain a food which bears comparison with a food of 100 W/W% animal meat in relation to taste and mouthfeel. Also, according to the present invention, it is possible to obtain various shapes of the accumulated textured protein which have various larger and smaller dimensions (in thickness and spread) instead of smaller shape such as granule, so that it may be used as a substitution not only for ground meat, but also for dried meat and food boiled down in soya sauce etc. Also, not as a substitute, it may be used as food by adding seasonings appropriately. Namely the textured protein obtained according to the present invention is allowed to extend the use thereof within a wide range compared with the prior art textured protein.

PRACTICAL EXAMPLE 1.

Raw soybean on the market was treated by n-hexane in the conventional manner to obtain defatted soybean which was only slightly denatured. 1 part by weight of the defatted soybean was added with 9 parts by weight of water, and in the conventional manner, insoluble matter was removed, thereby obtaining a defatted soybean milk of 6.4 W/W% of dry solid part and 4.2 W.W% of protein content. 1,000 g of this defatted soybean milk was treated with 1N solution of hydrochloric acid to prepare an aqueous liquid containing protein of pH 5.10. This aqueous liquid containing protein was forced into a cylindrical autoclave 1 of stainless steel as shown in FIG. 1, having a 20 cm diameter, 30 cm length and 9.4 liters capacity, and which contained 7 liters of hot water kept at 126° C. under a pressure of 3.0 kg/cm$^2$, through an orifice 2 having a bore of 1.0 mm at a level of 3 cm below the water surface under conditions of 3.5 kg/cm$^2$ pressure and with a velocity of 100 ml/min. The protein of forced-in aqueous liquid containing protein was accumulated at the interface 5 formed by water layer 3 and steam layer 4, thereby forming the reticulated and accumulated textured protein. Three minutes after the end of the injection of the aqueous liquid containing protein, the autoclave 1 was cooled in a conventional manner and a textured protein was obtained. The textured protein obtained according to the present method was 25 cm wide, 10 cm long and 0.5 cm thick and similar to animal meat of higher whiteness without soybean smell, and weighed 92.6 g (dry matter weight 32.4 g) and contained 88.4 W/W% of protein per dry matter. Accordingly, in the textured protein, the protein content in the defatted soybean milk was improved from 65.6 W/W% to 88.4 W/W% per dry solid matter. Also, a yield of the textured protein relative to the defatted soybean milk was 68%.

PRACTICAL EXAMPLE 2

A defatted soybean milk powder on the market (The Nisshin Oil Mills Co., Ltd. SOL-P NY: protein content 60.0 W/W%) was put in an aqueous solution of hydrochloric acid, thereby obtaining an aqueous liquid containing protein having protein content of 1.5 W/W%. Using the autoclave described in Practical Example 1, this aqueous liquid containing protein was forced thereinto from the level of 2 cm above the interface formed by the water layer and steam layer under the condition of 5.5 kg/cm$^2$ pressure and 70 ml/min. velocity. At this time, pressure and temperature of the autoclave were respectively 5.0 kg/cm$^2$ and 150° C. Thus injected aqueous liquid containing protein was accumulated at the interface resulting in production of textured protein having minute accumulated structure. After the end of injection of the aqueous liquid containing protein, the autoclave was cooled and thus the textured protein was obtained. The textured protein obtained in this method had a protein content of 85 W/W% per dry matter and had a satisfactory mouthfeel similar to that of animal meat.

PRACTICAL EXAMPLE 3

1 part by weight of a defatted soybean milk powder on the market (Japan Protein Industry Co., Ltd. PROTON MA-1: protein content 60.0 W/W%) was put in 9 parts by weight of aqueous liquid prepared by producing 0.2 W/W% agar gel and breaking down this gel by agitation thereof, thereby obtaining an aqueous liquid containing protein of protein content of 6.0 W/W% (pH 6.5). Then, this aqueous liquid containing protein was forced into the autoclave described in Practical Example 1, maintained at a pressure of 0.6 kg/cm$^2$ and at a temperature of 113° C. and containing 7 liters of buffer solution of 0.1 M acetic acid-sodium acetate (pH 4.50), under the condition of 0.7 kg/cm$^2$ pressure and 70 ml/min. flow rate. The protein of aqueous liquid containing protein forced in through an orifice of 1.0 mm bore at the level of 3 cm below from the surface of the buffer liquid was accumulated at the interface formed by the water layer and gas layer, thereby producing the textured protein. The textured protein obtained in the present method contained 93 W/W% of protein in relation to dry matter and had a mouthfeel similar to that of strongly fibrous meat.

PRACTICAL EXAMPLE 4

1 part by weight of the defatted soybean milk powder used in Practical Example 2 was put in 9 parts by weight of aqueous solution of citric acid thereby obtaining an aqueous liquid containing protein having pH 5.0 and protein content of 6.0 W/W%. 6 liters of water and 1 liter of soybean oil were put in the autoclave of Practical Example 1 thereby forming an interface of an aqueous liquid layer and a non-aqueous liquid layer by said water and oil, and then these were heated at 128° C. under 3.0 kg/cm$^2$ pressure. Then, said aqueous liquid containing protein was forced into water through an orifice having 1.0 mm bore to allow the textured protein to be accumulated at the interface of the water and oil. The textured protein obtained by the present method was such one that the oil was appropriately distributed between the fibers and its mouthfeel was that of the corned beef.

PRACTICAL EXAMPLE 5

A slightly-denatured defatted soybean meal on the market (The Nisshin Oil Mills Co., Ltd. SOL-P A) was added to water, and using conventional procedure, defatted soybean milk of protein content of 6.5 W/W% was obtained. After this defatted soybean milk was heated to 80° C., an aqueous liquid containing protein (pH 5.3) was prepared by addition of aqueous solution of hydrochloric acid to the heated soybean milk. Inside the autoclave used in Practical Example 1 a stainless steel net was mounted, and an orifice (1.0 mm bore) for forcing-in of the aqueous liquid containing protein was provided below the net. Next, hot water of 3.5 kg/cm$^2$ pressure at 140° C. was forced in so as to position the net face below the water level, and thereby an interface of the aqueous liquid layer and solid layer was formed in the autoclave. The protein of aqueous liquid containing protein forced in the autoclave at a pressure of 4.0 kg/cm$^2$ and a flow rate of 100 ml/min. was accumulated along the stainless steel net thereby forming the textured protein. The textured protein obtained by this method was composed of protein fibers containing 90 W/W% protein per dry matter and having a good water retention property, so that it was suitable for a meatlike filler.

PRACTICAL EXAMPLE 6

Peanut meal on the market was treated by n-hexane thereby obtaining a slightly-denatured defatted peanut meal. 1 part by weight of this defatted peanut meal was added with 9 parts by weight of water and in a conventional manner a defatted peanut milk of protein content of 4.0 W/W% was obtained. This defatted peanut milk was mixed with 0.2 W/W% of xanthan gum as thickening stabilizer, and then using aqueous solution of hydrochloric acid, an aqueous liquid containing protein of pH 5.2 was prepared. This aqueous liquid containing protein was textured under 3.0 kg/cm$^2$ pressure at 130° C. as in Practical Example 1. The textured protein obtained by this method had a mouthfeel similar to that of animal meat and was rich in elasticity.

PRACTICAL EXAMPLE 7

Soybean protein isolate on the market (Japan Protein Industry Co., Ltd. PROTON NA-2.90, protein content 90.0 W/W%) was dissolved in water, and then using aqueous solution of hydrochloric acid, an aqueous liquid containing protein (pH 2.0) was obtained. This aqueous liquid containing protein was allowed to stand for 30 min. at room temperature, and after subjecting to a low pH treatment, it was adjusted with an aqueous solution of sodium hydroxide to pH 4.2. At this time the protein content of the aqueous liquid containing protein was 12.0 W/W%. The protein of aqueous liquid containing protein was texturized at a pressure of 2.0 kg/cm$^2$ and a temperature of 120° C. similarly as in Practical Example 1. The textured protein obtained by this method had protein content of 94 W/W% in relation to dry matter, and a property similar to muscular texture of animal meat.

PRACTICAL EXAMPLE 8

A defatted soybean milk obtained by the same treatment as Practical Example 1 was added with an aqueous solution of sodium hydroxide to adjust to pH 12.0. It was allowed to stand for 30 min. at room temperature thereby subjecting to a high alkali treatment, and thereafter an aqueous liquid containing protein of pH 6.0 was obtained by use of aqueous solution of hydrochloric acid. At this time the protein content was 4.0 W/W%. The protein of aqueous liquid containing protein was texturized under 6.5 kg/cm$^2$ at 162° C. similarly as in Practical Example 1. The textured protein obtained by this method had protein content of 91 W/W% in dry matter and a sufficient mouthfeel like that of animal meat.

PRACTICAL EXAMPLE 9

The soybean protein isolate used in Practical Example 7 was put in an aqueous solution of hydrochloric acid thereby preparing an aqueous liquid containing protein of pH 4.5 having protein content of 20 W/W%. The protein of aqueous liquid containing protein was texturized under 2.0 kg/cm$^2$ at 120° C. like Practical Example 1. The textured protein obtained by this method had protein content of 92 W/W% in dry matter.

PRACTICAL EXAMPLE 10

1 part by weight of a mixture obtained by adding the defatted soybean milk powder used in Practical Example 3 with same amount of sodium caseinate on the market (Japan Organo Co., Ltd.) was put into 9 parts by weight of aqueous solution of acetic acid thereby preparing an aqueous liquid containing protein having pH 5.20 and protein content of 7.0 W/W%. The protein of aqueous liquid containing protein was texturized under 3.0 kg/cm$^2$ at 126° C. similarly as in Practical Example 1. The textured protein obtained by this method had protein content of 89 W/W% per dry matter, and was rich in elasticity compared with soybean protein alone, and had a higher chewing.

PRACTICAL EXAMPLE 11

3 parts by weight of the aqueous liquid containing protein (soybean protein) having pH 5.1 and protein content of 4.2 W/W% which was obtained by the treatment as in Practical Example 1, and 1 part by weight of a suspension in which a vital gluten powder on the market (Ezaki Glico Eishoku Co., Ltd., A-GUL K, protein content 70 W/W%) was suspended in 0.01 N solution of acetic acid so that a 10 W/W% solution of gluten was obtain, were mixed together thereby obtaining an aqueous liquid containing protein having pH 5.0 and protein content of 4.9 W/W%. The protein of aqueous liquid containing protein was texturized under 3.0 kg/cm$^2$ at 131° C. as in Practical Example 1. The textured protein obtained by this method had protein content of 88 W/W% in relate to dry matter and had a higher softness and combining property compared with soybean protein alone.

PRACTICAL EXAMPLE 12

1 part by weight of the defatted soybean milk powder on the market (The Nisshin Oil Mills Co., Ltd., SOL-P NY: protein content 60.0 W/W%) used in Practical Example 2 was put in 9 parts by weight of aqueous solution of hydrochloric acid added with 0.2 W/W% of guar gum as thickening stabilizer, thereby preparing an aqueous liquid containing protein of pH 5.2. 2,000 g of this aqueous liquid containing protein was forced into the water layer in an autoclave (cylindrical autoclave of 31 cm diameter, 56 cm height and 42 liters capacity), which previously contained 30 liters of hot water under 3.0 kg/cm$^2$ pressure and at a temperature of 130° C., through an orifice of 1.0 mm bore at a level of 10 cm below the water surface by means of a pressure pump under 3.5 kg/cm$^2$ pressure at a flow rate of 100 ml/min. The forced-in protein was accumulated at the interface of water vapor and heated water thereby producing the textured protein. After the completion of production of the textured protein, the autoclave was cooled by a cooling water and returned to atmospheric pressure, and then the textured protein was taken out. According to this method, a textured protein was obtained which was 30 cm in diameter, 1 cm thick and 389 g in weight without the soybean smell. This textured protein had 30 W/W% of dry solid matter, and the protein content thereof was as high as 92.5 W/W%. Also, in this method the yield of the textured protein relative to the starting protein reached to 90%. The textured protein obtained by this method had no off-flavor and had a structure like animal meat, and was such one that allowed the use thereof as substitution for the meat in animal meat products.

APPLICATION EXAMPLE OF PRODUCT

The textured protein obtained in Practical Example 12 was colored like meat by means of caramel and monascus color. This colored textured protein was loosened off in the direction of fibers, and added with 3 W/W% of sodium chloride and thereafter treated by a chilled curing method. On the other hand, a product prepared by adding a beef on the market with 3 W/W% of sodium chloride, was treated by a dry curing method, and cooked under a higher pressure at 121° C. for 30 min. and thereafter loosened off in the direction of fibers. The colored textured protein and the beef respectively loosened off in the direction of fibers were taken out respectively in an amount of 250 g, and these were added with 100 g of beef tallow, 1.5 g of pepper, 0.75 g of sodium glutamate and 0.5 g of allspice, and mixed and agitated together by means of a mixer to prepare a corned beef base. 125 g of the resulting corned beef base was filled in a can thereby subjecting to a vacuum packing, and thereafter subjected to a heating sterilization at 110° C. for 30 min. The corned beef obtained by this method having 50% substitution of the textured protein bore comparison with a corned beef of 100% beef in both taste and mouthfeel.

What is claimed is:

1. Method of producing an accumulated textured protein which comprises: injecting an aqueous liquid containing a vegetable protein content of 1-30 W/W% through an orifice into a treating area where an interface is formed by a lower aqueous liquid layer and an upper layer of one selected from the group consisting of gas, non-aqueous liquid and solid, and the protein is caused to be denatured under the condition of pH 4.0-6.5 and at a temperature of 110°-200° C., while allowing the protein to accumulate at the interface, thereby texturizing the protein into accumulated structure.

2. Method as claimed in claim 1, wherein the orifice for injecting the aqueous liquid containing vegetable protein into the treating area is located in the aqueous liquid.

3. Method as claimed in claim 1, wherein said upper layer is gas.

4. Method as claimed in claim 2, wherein said upper layer is gas.

5. Textured protein produced according to the method as claimed in claim 1.

6. Textured protein produced according to the method as claimed in claim 2.

7. Textured protein produced according to the method as claimed in claim 3.

8. Textured protein produced according to the method as claimed in claim 4.

9. A method of producing an accumulated textured vegetable protein, comprising:
providing a pressurized treatment zone comprising a lower aqueous liquid first layer and a second layer thereabove so as to define an interface between said two layers, said lower aqueous liquid layer being at a temperature of 110°-200° C.;
providing aqueous liquid slurry containing said vegetable protein in an amount of 1-30 W/W%, the total solids in said slurry being in the range of 1-35 W/W%;
gently injecting said aqueous liquid slurry through an orifice into said lower aqueous liquid layer at a position near said interface, and wherein the pH is maintained at 4.0-6.5; and
accumulating the protein at the interface, thereby texturizing the protein into an accumulated structure.

10. A method as claimed in claim 9, wherein said aqueous slurry of vegetable protein further contains a thickener.

11. A method as claimed in claim 10, wherein said thickener is selected from the group consisting of guar gum, xanthan gum, gum arabic, agar, konjak mannan, and fat.

12. A method as claimed in claim 10, wherein said thickener is present in an amount of up to 3 W/W% based on said vegetable protein.

13. A method as claimed in claim 9, wherein the vegetable protein content of said aqueous slurry is 3-20 W/W%.

14. A method as claimed in claim 9, wherein said treatment zone is in an autoclave.

15. A method as claimed in claim 14, wherein the accumulated textured protein is removed from said autoclave by means of a rotary valve.

16. A method as claimed in claim 1, wherein said lower aqueous liquid layer contains a boiling point changing substance.

17. A method as claimed in claim 16, wherein said boiling point changing substance is selected from the group consisting of glycerin, propylene glycol and salt.

18. A method as claimed in claim 1, wherein said lower aqueous liquid layer contains a pH adjusting agent.

19. A method as claimed in claim 9, wherein said upper layer is a gas under superatmospheric pressure.

20. A method as claimed in claim 9, wherein the pH is maintained at 4.5–5.5.

21. A method as claimed in claim 9, wherein the desired pH is maintained by adding acid to said aqueous liquid slurry of vegetable protein.

22. A method as claimed in claim 21, wherein said acid is selected from the group consisting of hydrochloric acid, phosphoric acid and citric acid.

* * * * *